United States Patent
Wang

(10) Patent No.: US 11,906,210 B1
(45) Date of Patent: Feb. 20, 2024

(54) REFRIGERATION AND INSULATION BAG

(71) Applicant: XIAMEN GODZILLA INDUSTRY & TRADE CO., LTD., Xiamen (CN)

(72) Inventor: Xiaoqing Wang, Xiamen (CN)

(73) Assignee: XIAMEN GODZILLA INDUSTRY & TRADE CO., LTD., Xiamen (CN)

( * ) Notice: Subject to any disclaimer, the term of this patent is extended or adjusted under 35 U.S.C. 154(b) by 0 days.

(21) Appl. No.: 18/137,414

(22) Filed: Apr. 20, 2023

(30) Foreign Application Priority Data

Mar. 15, 2023 (CN) .......................... 202320502121.0

(51) Int. Cl.
*F25B 21/02* (2006.01)
*F25D 11/00* (2006.01)
*A45C 15/00* (2006.01)
*A45C 11/20* (2006.01)

(52) U.S. Cl.
CPC .............. *F25B 21/02* (2013.01); *A45C 11/20* (2013.01); *A45C 15/00* (2013.01); *F25D 11/00* (2013.01)

(58) Field of Classification Search
CPC ......... F25B 21/02; A45C 11/20; A45C 15/00; F25D 11/00
See application file for complete search history.

(56) References Cited

U.S. PATENT DOCUMENTS

| | | | | |
|---|---|---|---|---|
| 3,823,567 A * | 7/1974 | Corini | ..................... | F25B 21/02 62/3.62 |
| 4,782,664 A * | 11/1988 | Sterna | ..................... | F25B 21/02 62/3.3 |
| 4,823,554 A * | 4/1989 | Trachtenberg | .......... | F25D 15/00 62/3.61 |
| 6,026,647 A * | 2/2000 | Coffee | .................... | A45C 11/20 62/3.62 |
| 9,668,510 B2 * | 6/2017 | Doman | .................... | A23L 3/363 |
| 11,472,624 B2 * | 10/2022 | Alexander | .............. | F25B 21/02 |
| 2019/0093909 A1 * | 3/2019 | Floyd | ..................... | A45C 11/20 |

* cited by examiner

Primary Examiner — Ana M Vazquez

(57) ABSTRACT

A novel refrigeration and insulation bag includes a bag body and a top cover. An interior of the bag body forms a cavity, and a top end of the bag body is provided with an opening. The top cover is used for closing the opening, an interior of the top cover forms an accommodating cavity, and a refrigeration assembly or a refrigeration/heating assembly is embedded in the accommodating cavity. The refrigeration assembly or refrigeration/heating assembly includes semiconductor chilling plates, heat dissipation fans, temperature-uniforming plate, power supply component, and other components. The refrigeration assembly or refrigeration/heating assembly of the present disclosure powered by electricity is configured to refrigerate the interior of the bag, so as to create a low-temperature environment without the need to frequently replace the ice packs before use, or configured to heat up the interior of the bag, so as to keep warm of the bag.

8 Claims, 10 Drawing Sheets

REFRIGERATION AND INSULATION BAG

CROSS-REFERENCE TO RELATED APPLICATIONS

This application is based upon and claims priority to Chinese Patent Application No. 202320502121.0, filed on Mar. 15, 2023, the entire content of which is incorporated herein by reference.

TECHNICAL FIELD

The present disclosure relates to the technical field of boxes and bags, in particular to a novel refrigeration and/or insulation bag.

BACKGROUND

As people's living condition improves, there are more and more activities that people can participate in for enjoyment when they are not working, such as going for an outing, traveling, hiking, caving and so on. During the outdoor activities, backpack is an indispensable tool for carrying more necessities such as water, clothing and so on.

Spring and summer are the peak seasons for outings, and quite a few tourists would choose to go mountaineering, the number of tourists who choose to go mountaineering is on the rise every year. However, what people want after a long period of activities in hot weather is usually a nice cold drink which cannot be provided by a conventional backpack.

In order to solve the problem in providing iced drink outdoors in summer, cooler bags for keeping low temperature have emerged on the market. For example, the Chinese patent No. CN213849209U discloses a cooler bag for holding ice packs, comprising a backpack main body, the backpack main body includes carrying straps and a cover that is detachably connected with the backpack main body by a zipper, and the inner walls of the backpack main body are all fixedly provided with accommodating components, the accommodating components are provided with ice holders for accommodating the ice packs, the accommodating components are provided with switching mechanisms for sealing the ice holders, and the accommodating components are provided with openings for releasing cold air.

For this kind of cooler bags, ice packs are placed in the ice holders in use, and items in the cooler bag are cooled by the cold air released by the ice packs. However, since ice packs need to be placed in the cooler bag before use to create a low temperature environment, on the one hand, the time for keeping cold by the ice packs is limited, on the other hand, the ice packs can only create a roughly low temperature, and the temperature cannot be precisely controlled. Further, the ice packs need to be replaced frequently, which causes high cost and operation troubles. In some conditions, the user would like to keep the items, such as foods and so on, warm in the bag. A common design is to configure an insulation layer to slow down the heat dissipation. However, such design can only achieve limited heat preservation interval and poor effects.

SUMMARY

In view of the above-mentioned technical problems and in order to overcome the drawbacks of the prior art, the present disclosure provides a novel refrigeration bag.

In order to solve the above technical problems, the present disclosure provides a novel refrigeration bag.

Technical effect: a refrigeration assembly powered by electricity is configured to refrigerate the interior of the bag, so as to create a low-temperature environment without the need to frequently replace the ice packs before use; the refrigeration assembly can detect and adjust the temperature in the bag in real time to achieve precise temperature control; the bag is suitable for storing different kinds of items and the whole bag can be used repeatedly as long as it gets recharged; the bag has low use cost, easy operation, and can even be used as a substitution of car refrigerator under certain circumstances, or the bag may be used to charge electronic devices such as mobile phones, thus the bag is multi-functional.

The technical solution of the present disclosure is as follows.

A refrigeration bag, comprising:
  a bag body, wherein an interior of the bag body forms a cavity, and a top end of the bag body is provided with an opening; and
  a top cover for closing the opening, wherein an interior of the top cover forms an accommodating cavity, and a refrigeration assembly is embedded in the accommodating cavity, the refrigeration assembly includes:
    a plurality of semiconductor chilling plates evenly distributed in the top cover, wherein a cold side of each semiconductor chilling plate faces the cavity to uniformly refrigerate the environment in the cavity;
    a plurality of heat dissipation fans connected to heat sides of the semiconductor chilling plates, wherein the heat dissipation fans are configured to create air flow to dissipate heat generated by the semiconductor chilling plates;
    a power supply component arranged in the accommodating cavity for supplying power to the refrigeration assembly; and
    a temperature-uniforming plate, wherein the temperature-uniforming plate is attached to the semiconductor chilling plates and seals the accommodating cavity.

Further, the power supply component includes a storage battery which is detachably installed or fixed in the accommodating cavity. A power switch and a charging interface are provided on side surfaces of the top cover. The storage battery is electrically connected to the power switch, the charging interface, the heat dissipation fans, and the semiconductor chilling plates by conducting wires.

As a further improvement of the above-mentioned novel refrigeration bag, the semiconductor chilling plates are connected to the temperature-uniforming plate through a fixing plate, and the fixing plate is provided with a plurality of accommodating recesses corresponding to the semiconductor chilling plates to accommodate the semiconductor chilling plates and conducting wires.

As a further improvement of the above-mentioned novel refrigeration bag, the fixing plate is connected with a heat dissipation finned plate, the heat dissipation finned plate includes a base plate and multiple fins arranged vertically to the base plate, the base plate is connected with the fixing plate, the heat dissipation fans are connected to a top end of the fins, and side surfaces of the top cover are provided with heat dissipation holes.

As a further improvement of the above-mentioned novel refrigeration bag, the top cover is fitted and engaged with the opening, a side of the top cover is rotatably connected to the bag body, and an opposite side of the top cover is connected to the bag body through a snap-fit component in a snap-fit manner. The snap-fit component includes a locking part rotatably connected to the top cover and a block fixed on the bag body and fitted with the locking part.

As a further improvement of the above-mentioned novel refrigeration bag, the temperature-uniforming plate is an aluminum plate, a copper-aluminum alloy plate, a graphite plate, a graphene plate, or a carbon fiber plate.

As a further improvement of the above-mentioned novel refrigeration bag, the charging interface is a type-C interface, a USB interface, an HDMI interface, or a lightning interface.

As a further improvement of the above-mentioned novel refrigeration bag, a bottom part of the top cover is provided with a heat insulation part surrounding the temperature-uniforming plate, a sealing ring is formed between the top cover and the bag body, an inner sidewall and a bottom surface of the bag body are both provided with an insulation layer, and the top cover is internally and electrically connected with a temperature controller.

As a further improvement of the above-mentioned novel refrigeration bag, the top cover is a structure formed by integral injection molding or has a split structure. When the top cover has the split structure, a plurality of pins parallel to each other are configured for positioning and bolts are configured for fastening the structure. The temperature controller includes a temperature sensor and a temperature measurement probe.

As a further improvement of the above-mentioned novel refrigeration bag, the power supply component includes a power adapter connected to the charging interface through a conducting wire, so as to output a stable voltage and supply power to the refrigeration assembly.

According to another aspect of the present disclosure, a novel insulation bag is provided which includes a bag body. An interior of the bag body forms a cavity, and a top end of the bag body is provided with an opening. The insulation bag further includes a top cover for closing the opening, an interior of the top cover forms an accommodating cavity, and a refrigeration/heating assembly is configured in the accommodating cavity, or a bottom part of the bag body forms an accommodating cavity for configuring the refrigeration/heating assembly, or the top cover and the bottom part of the bag body each forms an accommodating cavity for configuring the refrigeration/heating assembly respectively, each refrigeration/heating assembly includes:

- a plurality of semiconductor chilling plates evenly distributed in the accommodating cavity, when the refrigeration/heating assembly is used for refrigeration, a cold side of each semiconductor chilling plate faces the cavity of the bag body to uniformly refrigerate the environment in the cavity of the bag body, when refrigeration/heating assembly is used for heating, a heat side of each semiconductor chilling plate faces the cavity of the bag body to uniformly heat up the environment in the cavity of the bag body;
- a plurality of heat dissipation fans connected to one side of the semiconductor chilling plates, wherein the heat dissipation fans are configured to create air flow to dissipate heat generated by the semiconductor chilling plates;
- a power supply component arranged in the accommodating cavity for supplying power to the refrigeration/heating assembly; and
- a temperature-uniforming plate, wherein the temperature-uniforming plate is attached to the semiconductor chilling plates and seals the accommodating cavity;
- a control switch, wherein the control switch is electrically connected to the semiconductor chilling plates, and the control switch is operated to selectively change the side of the semiconductor chilling plates facing the cavity of the bag body to the cold side or the heat side of the semiconductor chilling plates by changing the polarity of the semiconductor chilling plates, such that the refrigeration/heating assembly is controlled by the control switch to work under refrigeration mode or heating mode.

As a further improvement of the above-mentioned insulation bag, the refrigeration/heating assembly further includes a venting channel for guiding and exhausting an airflow created by the heat dissipation fans. The venting channel includes a bottom plate and two guiding plates configured on two side of the bottom plate in parallel. A middle part of the bottom plate is convex and forms an installation recess, and a part of the bottom plate located above the installation recess is provided with an opening for installing the heat dissipation fans. A heat dissipation finned plate is arranged under the heat dissipation fans, the heat dissipation finned plate includes a base plate and multiple fins arranged vertically to the base plate, the heat dissipation fans are connected to a top end of the fins and located in the opening, and the heat dissipation finned plate is located in the installation recess, and side surfaces of the top cover or bottom part of the bag cover are provided with heat dissipation holes.

The present disclosure has the following advantages.

(1) According to the present disclosure, a refrigeration assembly is added to the bag, and after the refrigeration assembly starts to work, the interior temperature of the bag can be lowered down to an assigned temperature, and the insulation layer configured in the bag can maintain the temperature. After using the refrigeration function of the bag, user can get cool iced drinks or iced food, and the bag is convenient for carrying and use. Further, the refrigeration assembly is powered by a storage battery, one only needs to charge the bag before use to realize independent refrigeration function, and there is no need to replace the ice packs repeatedly, thereby ensuring the effect of use while reducing the cost. In addition, the bag as a whole can be used as a substitution of a car refrigerator, and the bag can be powered by the electricity input from the car to realize refrigeration. Further, the storage battery can in turn be used to charge electronic devices such as mobile phones and tablets, which is multi-functional. With the cooperation of the storage battery/vehicle-mounted power supply or other mobile power supply, the cold-reserving time can be extended indefinitely, which is convenient for users who require a ultra-long cold-reserving time. Further, the overall weight of the bag is low, so the bag is convenient and easy to carry.

(2) According to the present disclosure, the refrigeration assembly is internally provided with a temperature controller, and the real-time temperature in the bag is detected through the cooperation of the temperature sensor and the temperature probe. The refrigeration is stopped after the preset temperature is reached, so as to achieve the assigned temperature by control. A sealing ring is provided between the top cover and the bag body to improve the airtightness of the bag and ensure a constant temperature in the bag together with the insulation layer in the bag.

(3) According to the present disclosure, refrigeration is mainly realized by the semiconductor chilling plates, and the semiconductor chilling plates operate according to thermoelectric effect to achieve refrigeration. After the semiconductor chilling plates are powered on, their cold sides are attached to the temperature-uniforming plate, and the interior temperature of the bag is lowered down through the temperature-uniforming plate. Meanwhile, the heat sides of the semiconductor chilling plates are oriented toward the top, and the heat is dissipated under the cooperation of the heat dissipation finned plate and the heat dissipation fans.

(4) According to the present disclosure, the top cover may be formed by integral injection molding, or the top cover may have a split structure. The top cover having the split structure is fastened by bolts to facilitate disassembly and assembly. Heat dissipation holes are provided on the side of the top cover to assist in heat dissipation and to speed up the heat dissipation. The bag may be internally provided with a storage battery, or the bag may be directly provided with a power adapter. The storage battery can, in turn, be used to charge the electronic devices such as mobile phones, tablets and so on.

(5) According to the present disclosure, the refrigeration assembly powered by electricity is used to refrigerate the interior of the bag to create a low-temperature environment, and there is no need to frequently replace the ice packs before use. The refrigeration assembly can detect and adjust the interior temperature of the bag in real time to achieve the purpose of precise temperature control. Further, the bag is suitable for storing different kinds of items and the whole bag can be used repeatedly as long as it gets recharged; the bag has low use cost, easy operation, and can even be used as a substitution of car refrigerator under certain circumstances, or the bag may be used to charge electronic devices such as mobile phones, thus the bag is multi-functional.

(6) According to the present disclosure, the polarity of the semiconductor chilling plates can be changed by the control switch to freely switch the refrigeration/heating assembly between the refrigeration mode or the heating mode. The refrigeration/heating assembly may be arranged in the top cover or the bottom part of the bag body, or the refrigeration/heating assembly may also be arranged both in the top cover and the bottom part of the bag body. By doing so, the insulation bag is multifunctional and can meet various demands of the user. In some embodiments, the refrigeration/heating assembly may further be provided with a venting channel for guiding airflow and preventing irregular flow of air in the accommodating cavity which can affect the normal work of other components. Owing to the semiconductor chilling plates, unlike the commonly used refrigeration compressor, the insulation bag of the present disclosure would barely create noise during refrigeration or heating process, and the electrical wiring is waterproof and electrically insulated, which is convenient for use.

The reference signs are listed below: 1. bag body; 11. insulation layer; 111. outer layer; 112. insulation cotton layer; 113. inner layer; 2. top cover; 21. accommodating cavity; 22. power switch; 23. charging interface; 24. heat insulation part; 25. bolt; 26. heat dissipation holes; 3. refrigeration assembly; 31. semiconductor chilling plate; 32. heat dissipation fan; 33. temperature-uniforming plate; 34. fixing plate; 35. accommodating recess; 36. heat dissipation finned plate; 361. base plate; 362. fin; 37. temperature controller; 4. power supply component; 41. storage battery; 42. conducting wire; 5. snap-fit component; 51. locking part; 52. block; 3a. refrigeration/heating assembly; 6. control switch; 7. bottom cover; 38. venting channel; 381. bottom plate; 382. guiding plate; 383. installation recess; 384. opening.

DETAILED DESCRIPTION OF THE EMBODIMENTS

In order to further clarify the purpose, technical solution and advantages of the present disclosure, the present disclosure will be specified below in conjunction with the accompanying drawings and specific implementations. Some specific details are discussed in the following description to facilitate full understanding of the present disclosure. However, the present disclosure may also be implemented in many other ways different from those described herein, and those skilled in the art may make similar improvements without departing from the spirit of the present disclosure. Thus, the present disclosure is not intended to be limited by the specific implementations disclosed below.

It should be noted that when an element is described as being "fixed on" another element, the element may be directly arranged on the other element or there may be an intervening element. When an element is described as being "connected to" another element, the element may be directly connected to the other element or there may be an intervening element at the same time. The terms "vertical," "horizontal," "left," "right," and similar expressions are used herein merely for purposes of illustration and are not intended to represent that the implementation is the only way of doing so.

Unless otherwise defined, all technical and scientific terms used herein have the same meaning as commonly understood by one of ordinary skill in the technical field of this disclosure. The terminologies used in the description of the present disclosure are merely for the purpose of describing the specific embodiments, and are not intended to limit the scope of the present disclosure.

Figure 1:
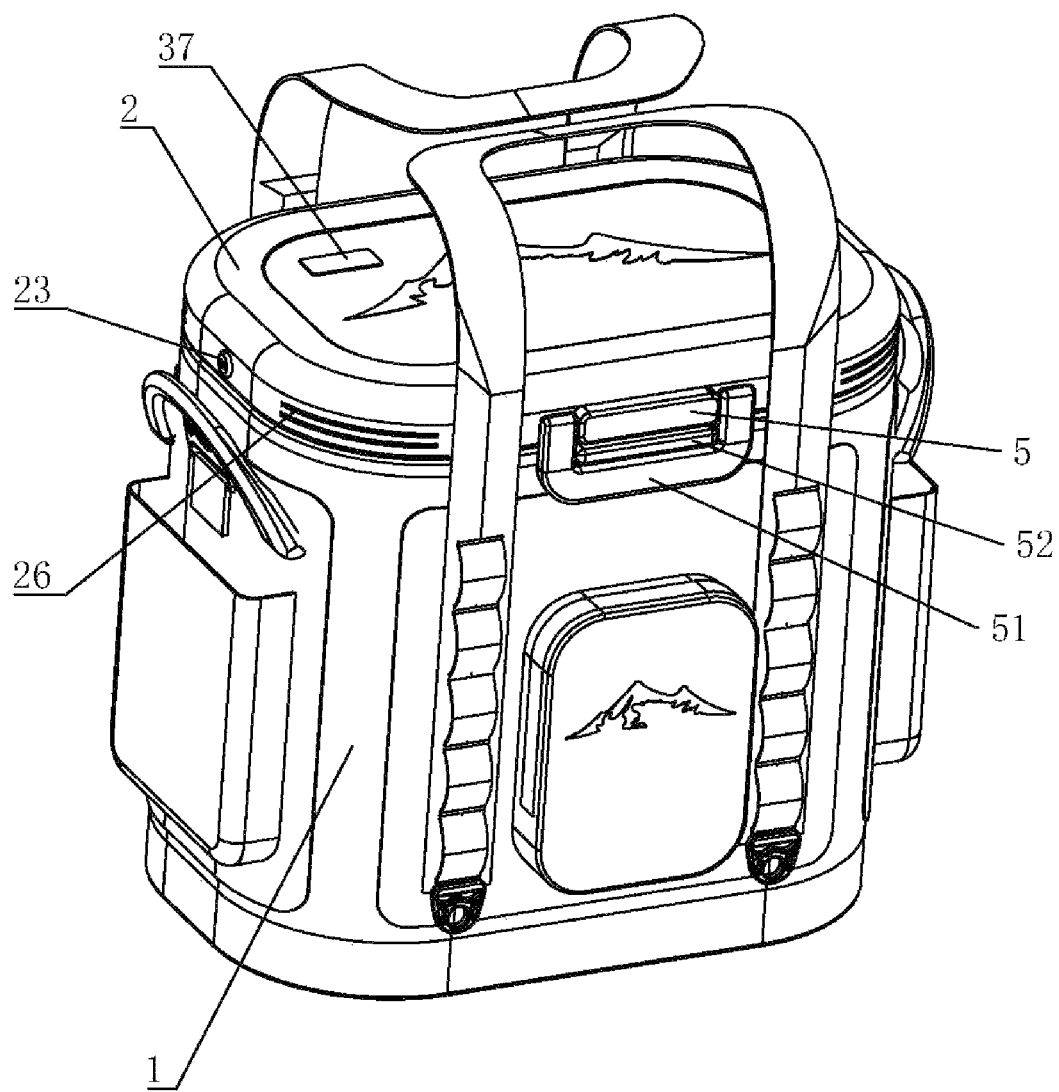
FIG. 1 is a structural diagram of embodiment 1.
Figure 2:
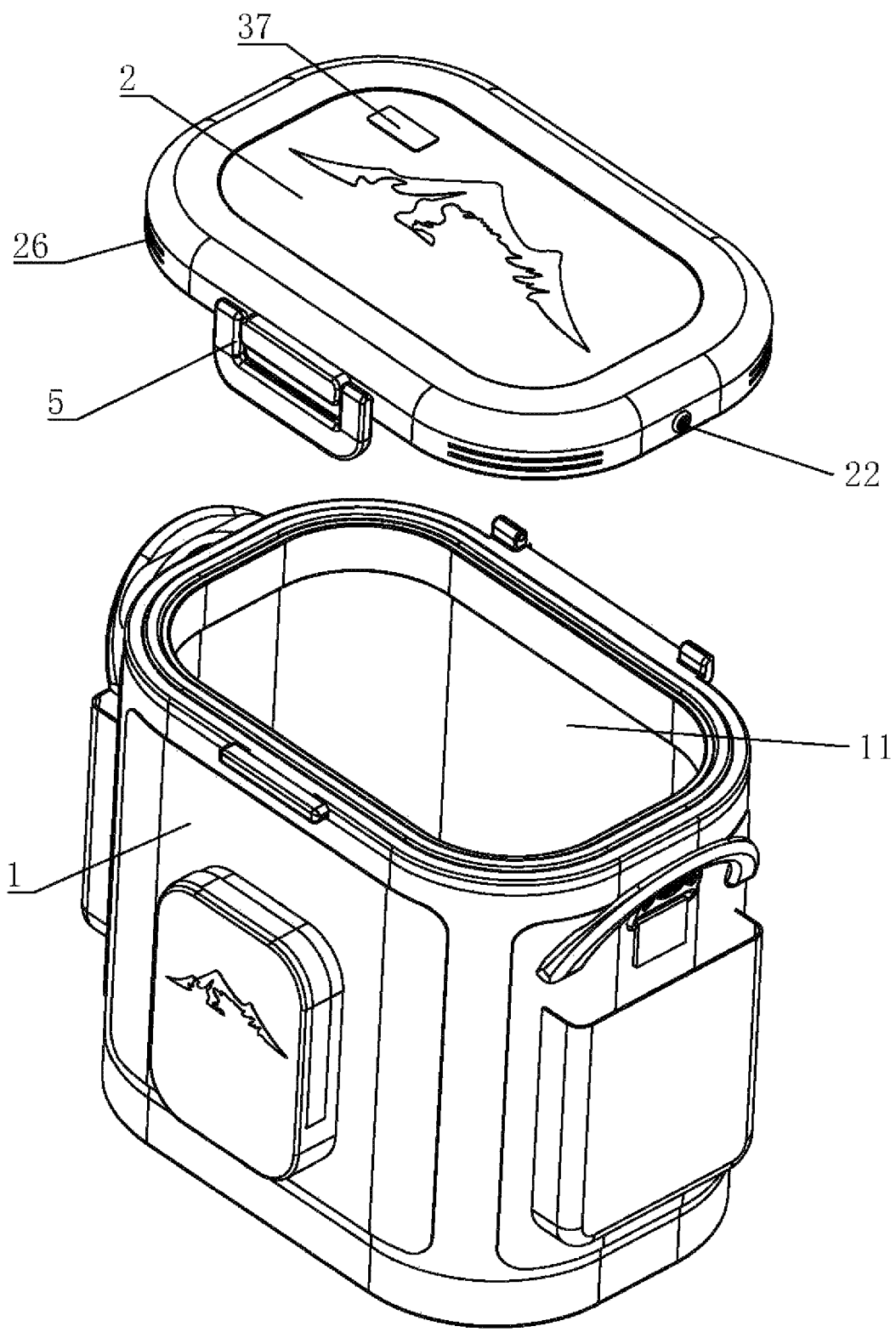
FIG. 2 is a structural diagram showing the bag body and top cover in embodiment 1.

According to the present embodiment, a novel refrigeration bag is provided, the structure of the refrigeration bag is shown in FIG. 1 to FIG. 2. The refrigeration bag, as a whole, includes a bag body 1 having a box shape and located at the lower part. The bag body 1 is externally fixed with straps, and the interior of the bag body 1 forms a cavity, and a top end of the bag body 1 is provided with an opening. The cavity is used for holding items such as drinks and food etc. A top cover 2 is rotatably connected to the top part of the bag body 1 at the position of the opening, and the front part of the top cover 2 is detachably connected to the bag body 1 by a snap-fit component 5.

The snap-fit component 5 mainly includes two parts, a locking part 51 rotatably connected to the top cover 2, and a block 52 fixed on the bag body 1. The locking part 51 is connectable to the block 52 in a snap-fit manner. The top cover 2 can be opened or closed by the snap-fit component 5.

Figure 3:
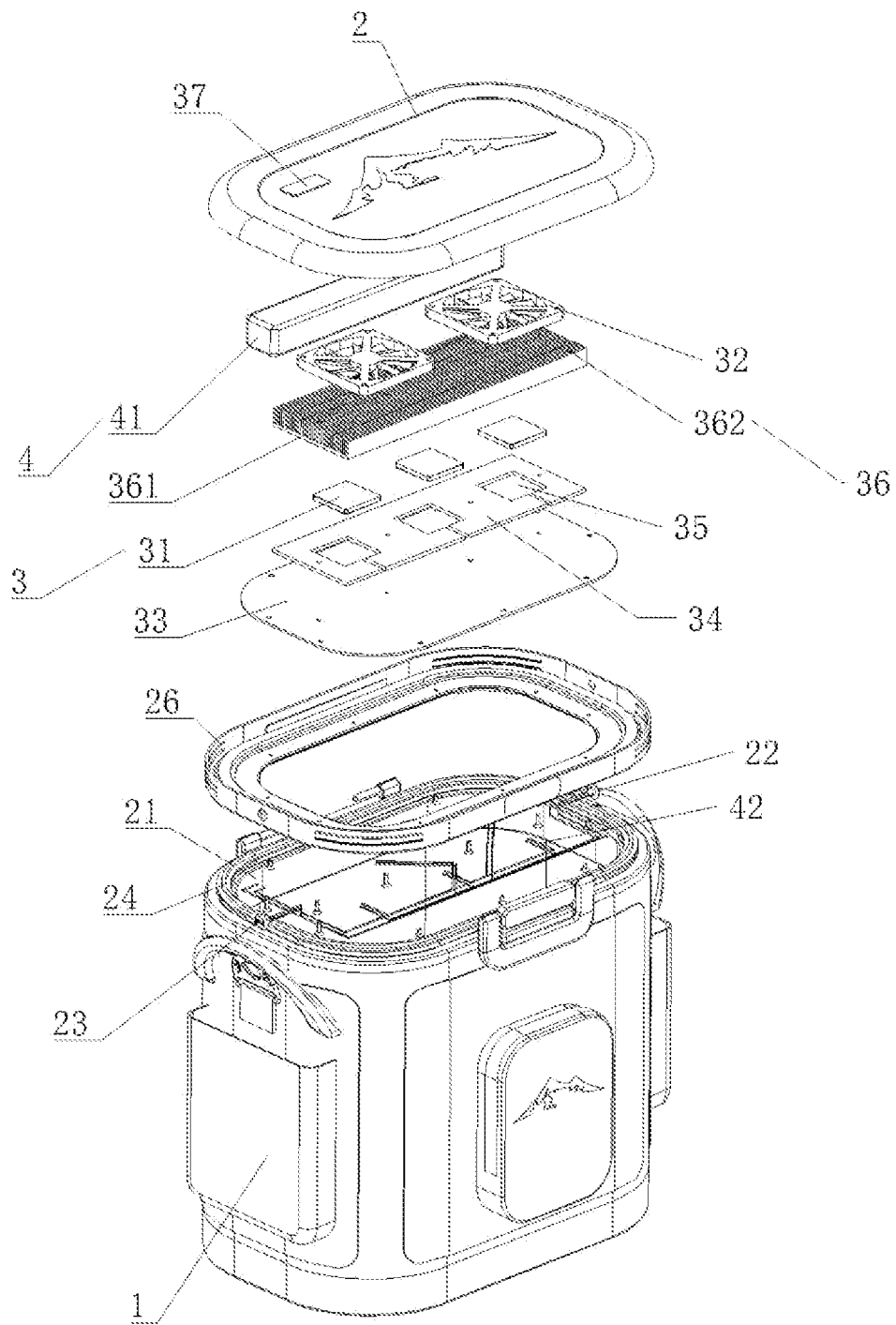
FIG. 3 is an exploded diagram of embodiment 1.
Figure 4:
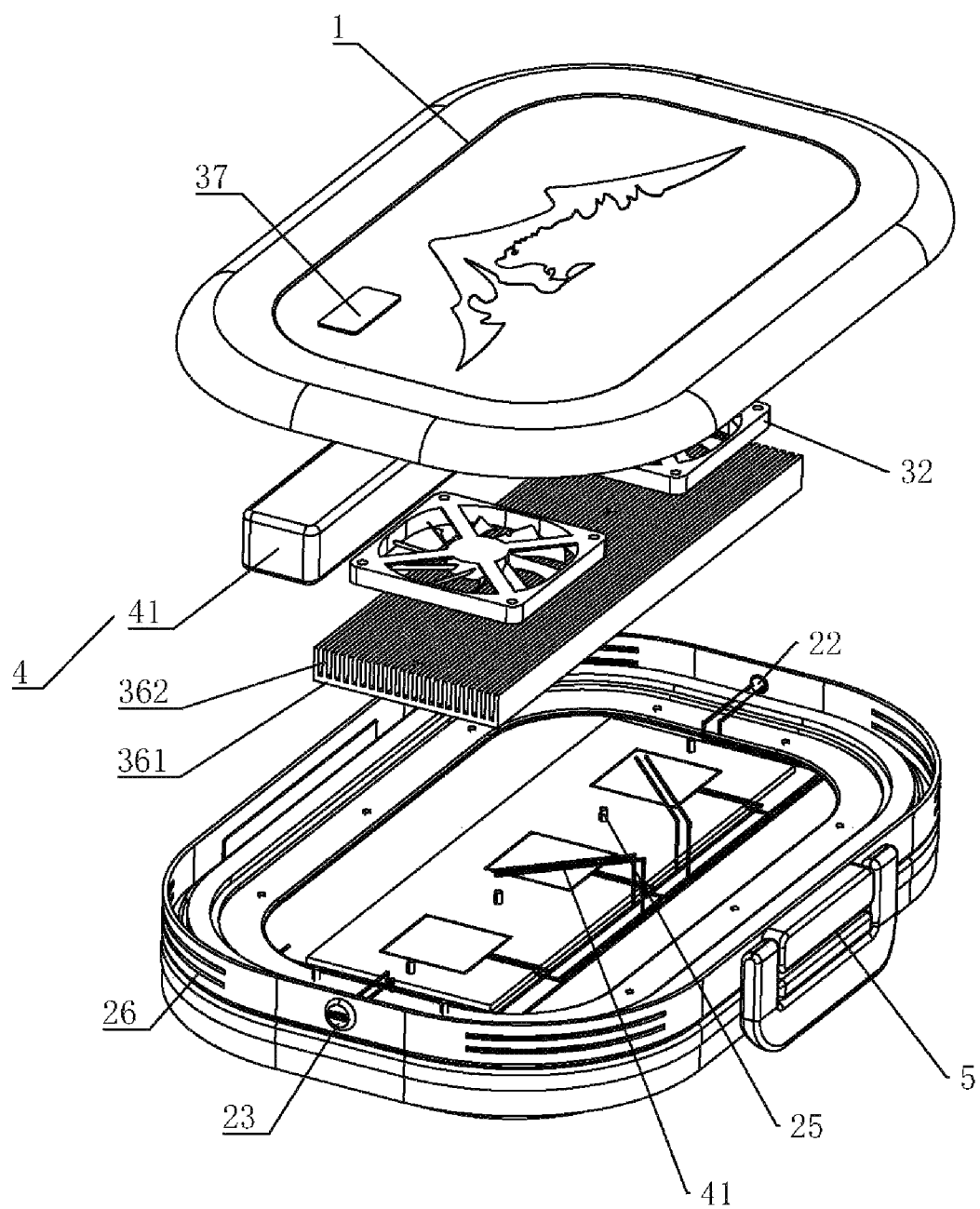
FIG. 4 is a structural diagram showing the refrigeration assembly in embodiment 1.

As shown in FIG. 1, FIG. 3 and FIG. 4, an interior of the top cover 2 forms an accommodating cavity 21, and a refrigeration assembly 3 is embedded in the accommodating cavity 21. The refrigeration assembly 3 includes a temperature-uniforming plate 33 fixed on a bottom part of the top cover 2 for sealing the accommodating cavity 21. Three semiconductor chilling plates 31 arranged in parallel are attached on the temperature-uniforming plate 33. A fixing plate 34 is arranged above the temperature-uniforming plate 33, and the fixing plate 34 is provided with three accommodating recesses 35 for accommodating and fixing the semiconductor chilling plates 31 and conducting wires 42.

A heat dissipation finned plate 36 is arranged above the fixing plate 34, and heat dissipation fans 32 are connected to the top of the heat dissipation finned plate 36. The cold sides of the semiconductor chilling plates 31 are attached to the temperature-uniforming plate 33, while the heat sides thereof are attached to the heat dissipation finned plate 36. The heat dissipation finned plate 36 include a base plate 361 located at the bottom, and a plurality of fins 362 parallel to each other are vertically formed on the base plate 361. The heat dissipation fans 32 are attached to the top of the fins 362.

A power supply component 4 is also provided on a side of the accommodating cavity 21. The power supply component 4 may be a power adapter or a storage battery 41. When the power supply component 4 is a power adapter, it can directly supply power to the refrigeration assembly 3 by a vehicle-mounted power or by plugging in other power supplies. When the power supply component 4 is a storage battery 41, the storage battery 41 and the refrigeration assembly 3 are electrically connected through conducting wires 42. Further, side surfaces of the top cover 2 are provided with several heat dissipation holes 26.

A power supply component 4 is provided on a first side of the top cover 2, and a charging interface 23 is provided on a second side of the top cover 2, which are respectively used for starting the entire refrigeration assembly 3 and charging or discharging of the storage battery 41. The top cover 2 is also provided with a temperature controller 37 which includes a temperature sensor and a temperature measurement probe. The top cover 2 is a structure formed by integral injection molding or has a split structure. When the top cover 2 has a split structure, a plurality of pins parallel to each other are configured for positioning and bolts 25 are configured for fastening the structure.

When the top cover 2 is a structure formed by integral injection molding, the top cover 2 is integrated to form an integrated product, which can significantly reduce the weight of the top cover 2, shorten the molding cycle, stabilize production quality, achieve accurate dimensions, and can eliminate the complicated work of arranging the sealing rings, thereby making the subsequent automatic assembling processes easier.

According to the present embodiment, the temperature-uniforming plate 33 may be an aluminum plate, a copper-aluminum alloy plate, a graphite plate, a graphene plate, or a carbon fiber plate. The plates made of the above materials can all achieve a good temperature-uniforming and refrigeration effect, and the aluminum plate is the most cost-effective material. The charging interface 23 may be a Type-C interface, a USB interface, an HDMI interface, or a Lightning interface. Preferably, the charging interface 23 is a Type-C interface. Since the Type-C interface can directly perform charging and discharging operations, the user can, in turn, use the storage battery 41 to charge electronic devices such as mobile phones or tablets and so on, thereby further improving the degree of convenience.

In addition, the sidewall and bottom surface of the cavity inside the bag body 1 are both provided with an insulation layer. Plus, the top cover 2 also have insulation function, such that the effective time of keeping low temperature in the bag body 1 can be lasted for a ultra-long period of time, and the cold-reserving time can be improved to enable users to store food and beverage at low temperature for a long time. After the refrigeration assembly 3 starts to work, the effective cold-reserving time in the bag body 1 can be extended. As long as the storage battery can provide sufficient power supply, the time of maintaining low temperature can be extended for multiple times, so as to offer good adaptability to users who need long-time low-temperature storage.

Figure 5:
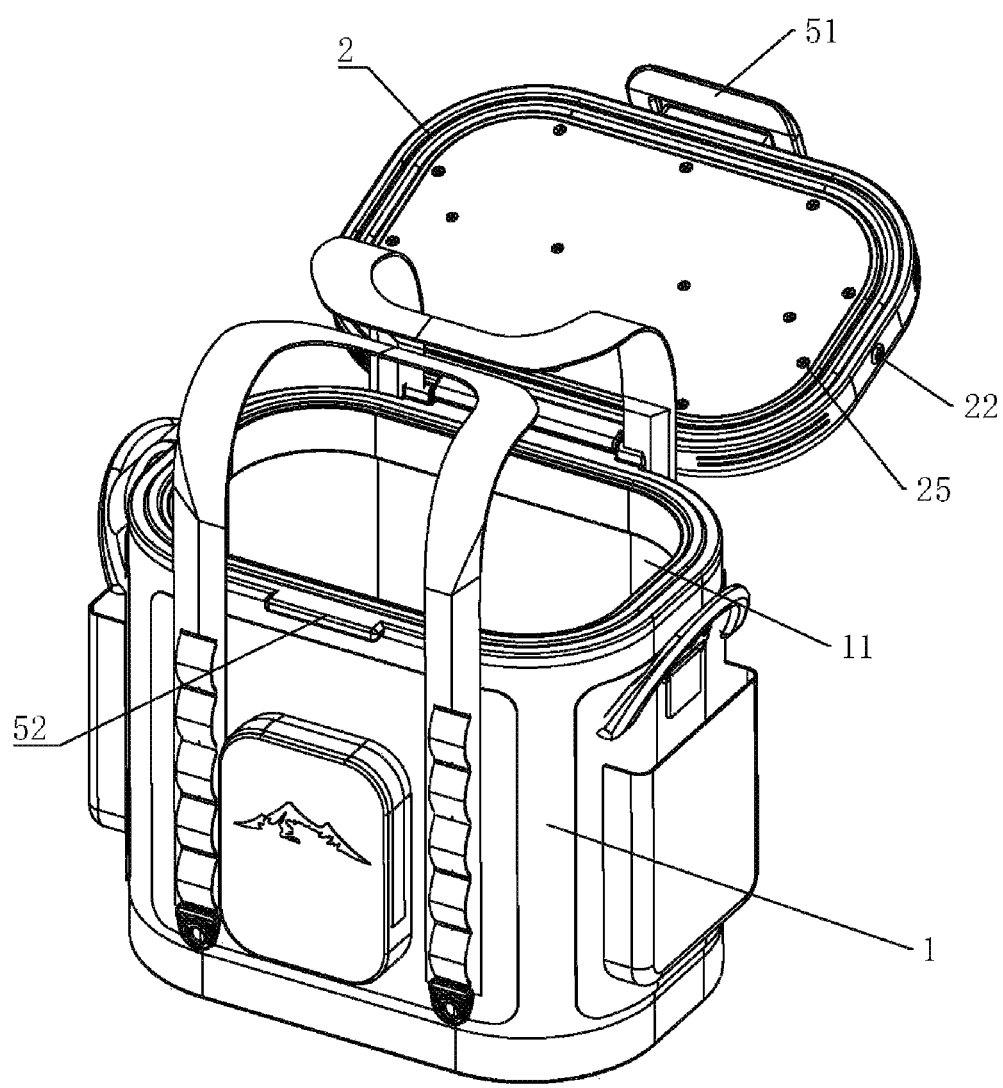
FIG. 5 is a schematic diagram of the refrigeration bag when the top cover is opened.
Figure 6:
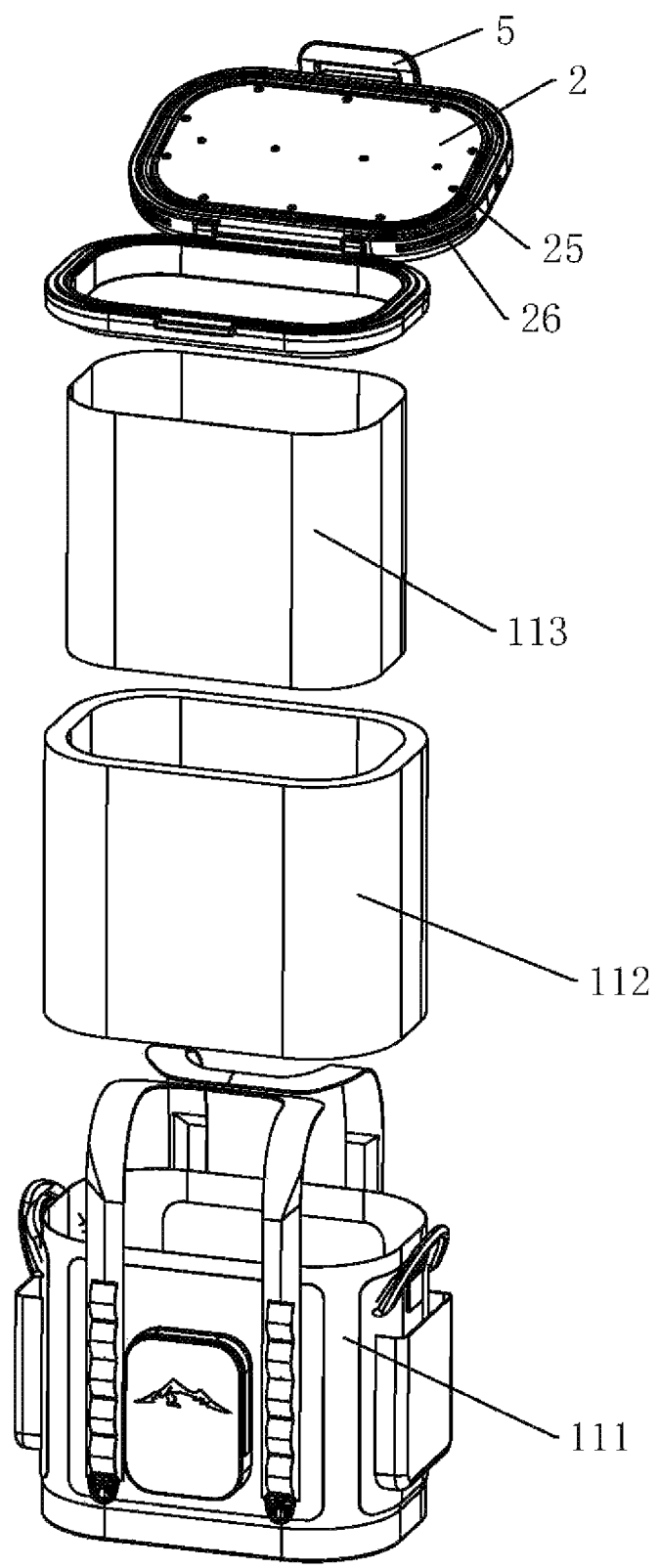
FIG. 6 is a schematic diagram showing the explosion of components of the bag body.

As shown in FIG. 5 and FIG. 6, the bag body 1 includes an outer layer 111 located at the outermost layer of the bag body 1, and the outer layer 111 is made of TPU/PVC or other waterproof material. As shown in FIG. 6, the bottommost part has a good waterproof effect, excellent strength and flexibility, good durability and wear resistance. Inside the waterproof fabric is the insulation cotton layer 112. In this application, the available materials for the insulation cotton layer 112 include PU foamed cotton, PE foamed cotton, NBR thermal insulation cotton, or EVA thermal insulation cotton. The insulation cotton layer 112 has good temperature-reserving and insulation effect, so the insulation cotton layer 112 is the most important part for keeping the low temperature in the bag body 1.

As shown in FIG. 6, an inner layer 113 made of TPU material, PVC material, PEVA material or other thermal insulation cotton materials is further provided inside the insulation cotton layer 112. On the one hand, the inner layer 113 can fix the insulation cotton inside the bag body 1. On the other hand, the inner layer 113 can also achieve a good moisture-proof effect, so as to keep the inner cavity of the bag body 1 dry and make the bag more suitable for storing food and drinks.

The overall weight of the bag body made of the above materials is low, so the refrigeration bag is light, convenient, and easy to carry. At the same time, the bag has good heat insulation effect and ultra-long cold-reserving time, plus the refrigeration assembly powered by electricity, the bag can achieve refrigeration effect with unlimited time. In combination with storage battery, vehicle-mounted power supply or other mobile power supplies, the cold-reserving time can be extended indefinitely, which is convenient for users who need ultra-long cold-reserving time.

The specific processes for implementing the present disclosure are described below.

After the power supply is turned on, the semiconductor chilling plates 31 start refrigeration. Specifically, the semiconductor chilling plates 31 operate according to thermo-electric effect to achieve refrigeration. The cold sides of the semiconductor chilling plates 31 are attached to the temperature-uniforming plate 33, after the semiconductor chilling plates 31 are supplied with power, the interior temperature of the bag is lowered down through the temperature-uniforming plate 33. Meanwhile, the heat sides of the semiconductor chilling plates 31 are oriented toward the top part, and the heat generated is dissipated under the cooperation of the heat dissipation finned plate 36 and the heat dissipation fans 32, and then the circulation of the airflow is realized by the heat dissipation holes 26 to take heat away.

Further, the temperature controller 37 located at the top cover 2 can detect the real-time temperature in the bag and can stop working after reaching certain temperature to guarantee the control of temperature. In addition, a bottom part of the top cover 2 is provided with a heat insulation part 24 surrounding the temperature-uniforming plate 33, and a sealing ring is provided between the top cover 2 and the bag, in combination with the insulation layer provided inside the bag body 1, the heat exchange can be suppressed to ensure that the interior of the bag is kept in a low temperature state for a long time.

According to the present disclosure, the refrigeration assembly 3 powered by electricity is configured to refrigerate the interior of the bag, so as to create a low-temperature environment without the need to frequently replace the ice packs before use; the refrigeration assembly 3 can detect and adjust the temperature in the bag in real time to achieve precise temperature control; the bag is suitable for storing different kinds of items and the whole bag can be used repeatedly as long as it gets recharged; the bag has low use cost, easy operation, and can even be used as a substitution of car refrigerator under certain circumstances, or the bag may be used to charge electronic devices such as mobile phones, thus the bag is multi-functional.

According to another aspect of the present disclosure, a novel insulation bag is provided which includes a bag body 1. An interior of the bag body 1 forms a cavity, and a top end of the bag body 1 is provided with an opening. The insulation bag further includes a top cover 2 for closing the opening, an interior of the top cover 2 forms an accommodating cavity, and a refrigeration/heating assembly 3a is configured in the accommodating cavity, or a bottom cover 7 of the bag body 1 forms an accommodating cavity for configuring the refrigeration/heating assembly 3a, or the top cover 2 and the bottom cover 7 of the bag body each forms an accommodating cavity for configuring the refrigeration/heating assembly 3a respectively, each refrigeration/heating assembly 3a includes:

- a plurality of semiconductor chilling plates 31 evenly distributed in the accommodating cavity, when the refrigeration/heating assembly 3a is used for refrigeration, a cold side of each semiconductor chilling plate 31 faces the cavity of the bag body 1 to uniformly refrigerate the environment in the cavity of the bag body 1, when refrigeration/heating assembly 3a is used for heating, a heat side of each semiconductor chilling plate 31 faces the cavity of the bag body 1 to uniformly heat up the environment in the cavity of the bag body 1;
- a plurality of heat dissipation fans 32 connected to one side of the semiconductor chilling plates 31, wherein the heat dissipation fans 32 are configured to create air flow to dissipate heat generated by the semiconductor chilling plates 31;
- a power supply component 4 arranged in the accommodating cavity for supplying power to the refrigeration/heating assembly 3a; and
- a temperature-uniforming plate 33, wherein the temperature-uniforming plate 33 is attached to the semiconductor chilling plates 31 and seals the accommodating cavity;
- a control switch 6, wherein the control switch 6 is electrically connected to the semiconductor chilling plates 31, and the control switch 6 is operated to selectively change the side of the semiconductor chilling plates 31 facing the cavity of the bag body 1 to the cold side or the heat side of the semiconductor chilling plates 31 by changing the polarity of the semiconductor chilling plates 31, such that the refrigeration/heating assembly 3a is controlled by the control switch 6 to work under refrigeration mode or heating mode.

Figure 7:
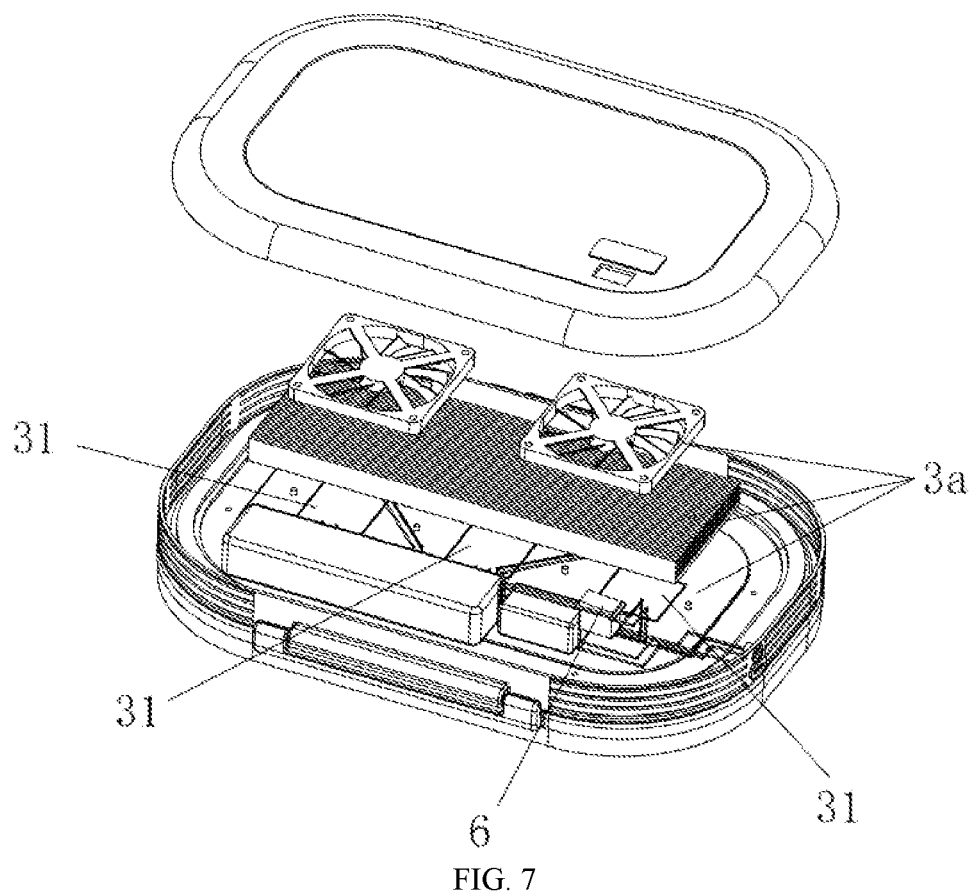
FIG. 7 is a structural diagram showing a refrigeration/heating assembly according to another embodiment of the present disclosure.

FIG. 7 shows an embodiment that the refrigeration/heating assembly 3a is arranged in the top cover. FIG. 11 shows an embodiment that the refrigeration/heating assembly 3a is arranged in the bottom cover 7. The polarity of the positive and negative terminals of the semiconductor chilling plates 31 can be changed by operating the control switch 6, so as to turn the side of the semiconductor chilling plates 31 facing the cavity of the bag body 1 to a cold side or a heat side, thereby realizing the switching between refrigeration mode and heating mode. Owing to the semiconductor chilling plates, unlike the commonly used refrigeration compressor, the insulation bag of the present disclosure would barely create noise during refrigeration or heating process, and the electrical wiring is waterproof and electrically insulated, which makes the insulation bag suitable for more outdoor activities. It should be noted that other features of the embodiments shown in FIG. 7 and FIG. 10 that are not described in detail herein may share the same structure of corresponding features shown in FIGS. 1-6, and specific description is not repeated hereinafter.

Figure 10:
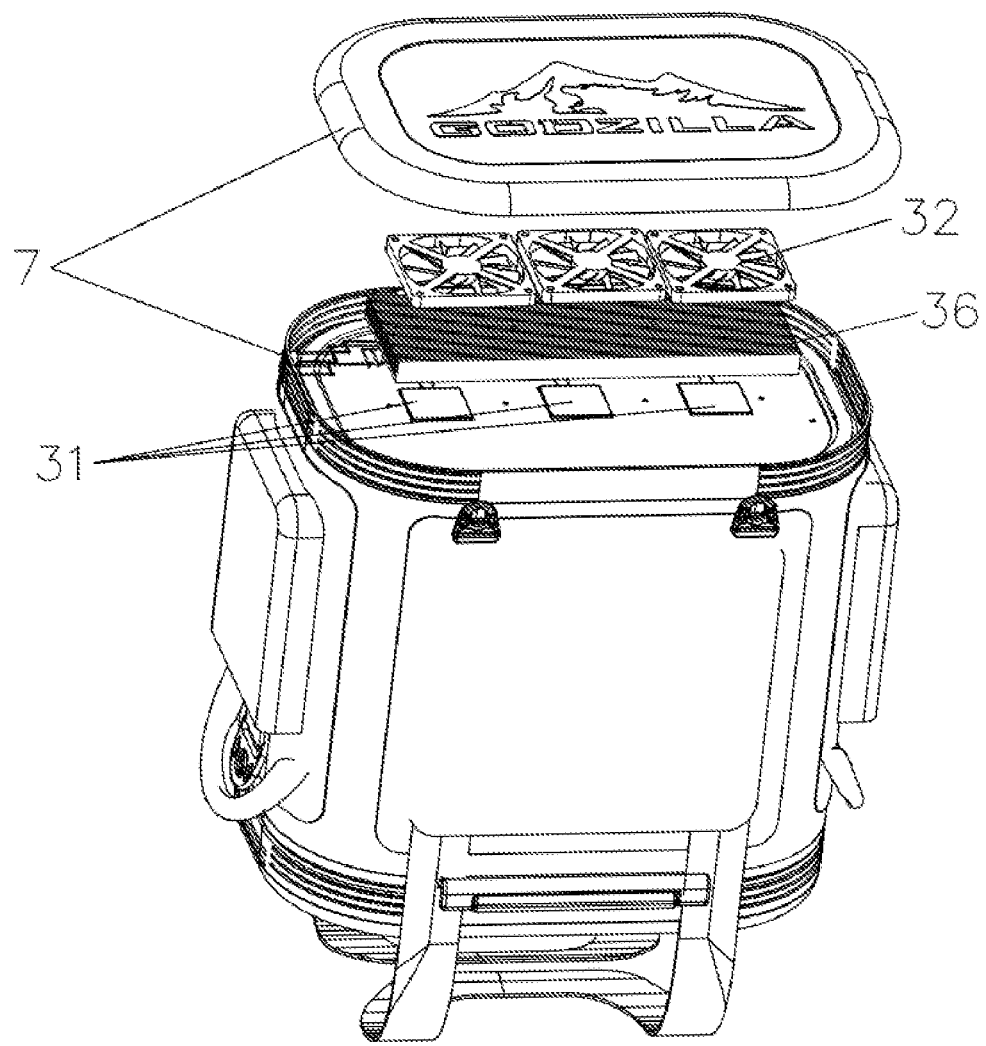
FIG. 10 is a structural diagram of the insulation bag according to still another embodiment of the present disclosure, in which the internal structure of the bottom cover is partially shown.
Figure 11:
FIG. 11 is a structural diagram of the insulation bag according to still another embodiment of the present disclosure.

As shown in FIG. 10, in some embodiments, the refrigeration/heating assembly 3a may also be arranged in the bottom cover 7 located at the bottom part of the bag body 1, or the top cover 2 and the bottom cover 7 are both provided with a refrigeration/heating assembly 3a respectively. Material of the top cover 2 and the bottom cover 7 may be an injection molded material, and the bag body 1, the top cover 2, and the bottom cover 7 may be made of hard materials. Except that the location where the refrigeration/heating assembly 3a is arranged may be different, other configuration and connection relationship of the refrigeration/heating assembly 3a is the same as the embodiment shown in FIG. 3, thus not being repeated hereinafter.

Figure 8:
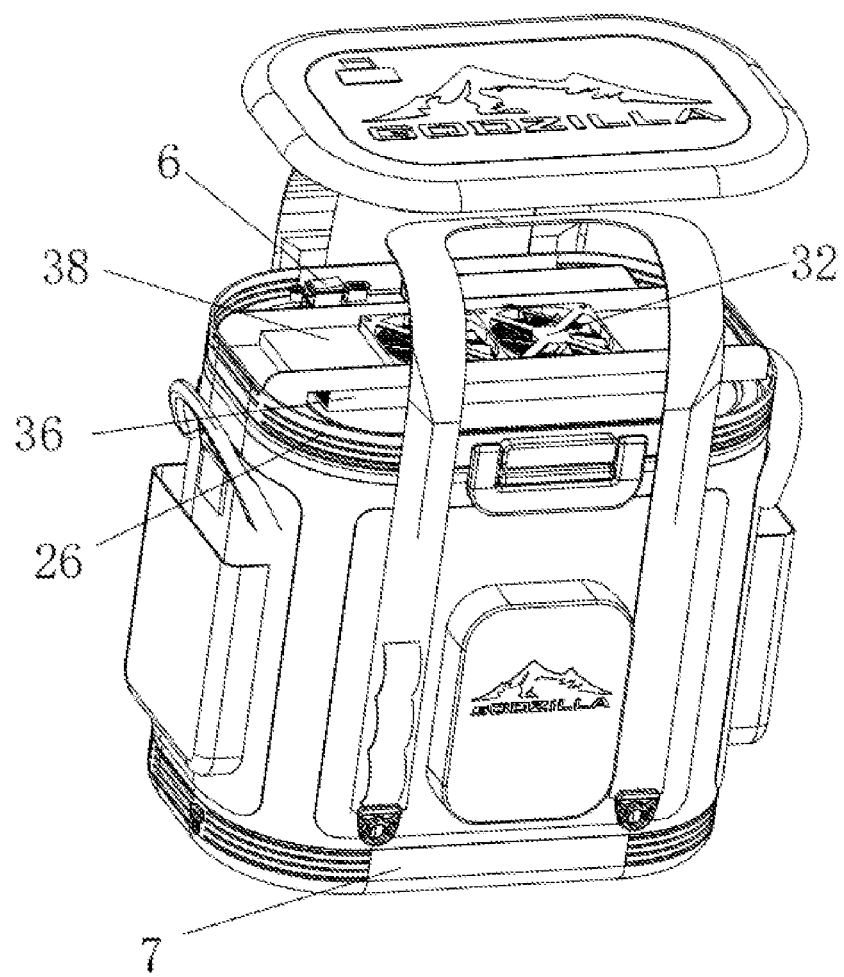
FIG. 8 is a structural diagram of the insulation bag according to yet another embodiment of the present disclosure, in which the internal structure of the top cover is partially shown.
Figure 9:
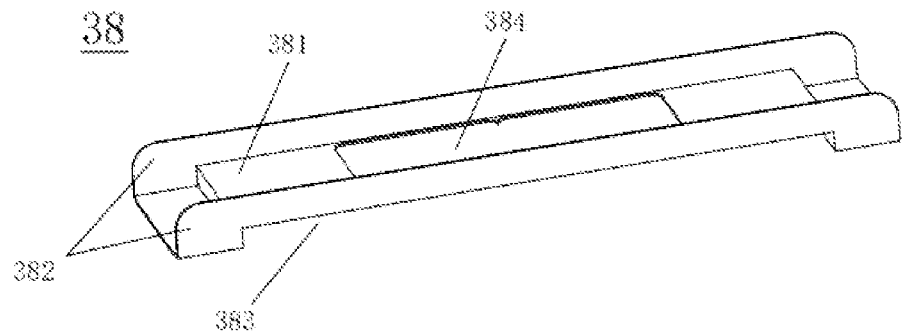
FIG. 9 is a structural diagram of a venting channel of the insulation bag according to the embodiment shown in FIG. 8.

As shown in FIG. 8-9, in some embodiments, the refrigeration/heating assembly 3a may further include a venting channel 38 for guiding and exhausting an airflow created by the heat dissipation fans 32. The venting channel 38 includes a bottom plate 381 and two guiding plates 382 configured on two side of the bottom plate 381 in parallel. A middle part of the bottom plate 381 is convex and forms an installation recess 383, and a part of the bottom plate 381 located above the installation recess 383 is provided with an opening 384 for installing the heat dissipation fans 32. A heat dissipation finned plate 36 is arranged under the heat dissipation fans 32, the heat dissipation finned plate 36 includes a base plate 361 and multiple fins 362 arranged vertically to the base plate 361, the heat dissipation fans 32 are connected to a top end of the fins 362 and located in the opening 384, and the heat dissipation finned plate 36 is located in the installation recess 383, and side surfaces of the top cover 2 or bottom cover 7 are provided with heat dissipation holes 26 with strip shape. Alternatively, the top cover 2 may also be provided with through holes for heat dissipation as shown in FIG. 11.

In some embodiments, the refrigeration/heating assembly 3a may also be powered by solar energy or mechanical power generator etc. Specific structure for solar energy generation or mechanical power generation may be commonly used structures known in the art, thus not being repeated hereinafter.

In addition to the above embodiments, the present disclosure may also have other implementations. All technical solutions derived from equivalent substitution or equivalent transformation should be considered as falling within the scope of protection defined by the present disclosure.

What is claimed is:

1. A novel refrigeration bag, comprising:
a bag body, wherein an interior of the bag body forms a cavity, and a top end of the bag body is provided with an opening; and
a top cover for closing the opening, wherein an interior of the top cover forms an accommodating cavity, and a refrigeration assembly is embedded in the accommodating cavity, the refrigeration assembly includes:
a plurality of semiconductor chilling plates evenly distributed in the top cover, wherein a cold side of each semiconductor chilling plate faces the cavity to uniformly refrigerate the environment in the cavity;
a plurality of heat dissipation fans connected to heat sides of the semiconductor chilling plates, wherein the heat dissipation fans are configured to create air flow to dissipate heat generated by the semiconductor chilling plates;
a power supply component arranged in the accommodating cavity for supplying power to the refrigeration assembly; and
a temperature-uniforming plate, wherein the temperature-uniforming plate is attached to the semiconductor chilling plates and seals the accommodating cavity; the temperature-uniforming plate is a planar structure and is located under the semiconductor chilling plates;
the semiconductor chilling plates are connected to the temperature-uniforming plate through a fixing plate, and the fixing plate is provided with a plurality of accommodating recesses corresponding to the semiconductor chilling plates to accommodate the semiconductor chilling plates and conducting wires;
the fixing plate is connected with a heat dissipation finned plate, the heat dissipation finned plate comprises a base plate and a plurality of fins arranged vertically to the base plate, the base plate is connected with the fixing plate, the heat dissipation fans are connected to a top end of the fins, and side surfaces of the top cover are provided with heat dissipation holes.

2. The novel refrigeration bag according to claim 1, wherein the power supply component comprises a storage battery which is detachably installed or fixed in the accommodating cavity, a power switch and a charging interface are provided on side surfaces of the top cover, the storage battery is electrically connected to the power switch, the charging interface, the heat dissipation fans, and the semiconductor chilling plates by conducting wires.

3. The novel refrigeration bag according to claim 2, wherein the charging interface is a type-C interface, a USB interface, an HDMI interface, or a lightning interface.

4. The novel refrigeration bag according to claim 2, wherein the power supply component comprises a power adapter connected to the charging interface through a conducting wire, so as to output a stable voltage and supply power to the refrigeration assembly.

5. The novel refrigeration bag according to claim 1, wherein the top cover is fitted and engaged with the opening, a side of the top cover is rotatably connected to the bag body, and an opposite side of the top cover is connected to the bag body through a snap-fit component in a snap-fit manner, the snap-fit component comprises a locking part rotatably connected to the top cover and a block fixed on the bag body and fitted with the locking part.

6. The novel refrigeration bag according to claim 1, wherein the temperature-uniforming plate is an aluminum plate, a copper-aluminum alloy plate, a graphite plate, a graphene plate, or a carbon fiber plate.

7. The novel refrigeration bag according to claim 1, wherein a bottom part of the top cover is provided with a heat insulation part surrounding the temperature-uniforming plate, a sealing ring is formed between the top cover and the bag body, an inner sidewall and a bottom surface of the bag body are both provided with an insulation layer, and the top cover is internally and electrically connected with a temperature controller.

8. The novel refrigeration bag according to claim 7, wherein the top cover is a structure formed by integral injection molding or has a split structure.

* * * * *